United States Patent
Hwang et al.

(10) Patent No.: US 11,733,968 B2
(45) Date of Patent: Aug. 22, 2023

(54) NEURAL PROCESSING UNIT, NEURAL PROCESSING SYSTEM, AND APPLICATION SYSTEM

(71) Applicant: Samsung Electronics Co., Ltd., Suwon-si (KR)

(72) Inventors: Young Nam Hwang, Hwaseong-si (KR); Hyung-Dal Kwon, Hwaseong-si (KR); Dae Hyun Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1032 days.

(21) Appl. No.: 16/439,928

(22) Filed: Jun. 13, 2019

(65) Prior Publication Data
US 2020/0151549 A1    May 14, 2020

(30) Foreign Application Priority Data
Nov. 9, 2018 (KR) .................. 10-2018-0137345

(51) Int. Cl.
G06F 7/544 (2006.01)
G06F 17/15 (2006.01)
G06N 3/063 (2023.01)
G06N 3/045 (2023.01)

(52) U.S. Cl.
CPC .......... G06F 7/5443 (2013.01); G06F 17/15 (2013.01); G06N 3/045 (2023.01); G06N 3/063 (2013.01)

(58) Field of Classification Search
CPC ............ G06F 7/5443; G06F 17/15; G06F 2207/4824; G06N 3/0454; G06N 3/063; G06N 3/0445
See application file for complete search history.

(56) References Cited

U.S. PATENT DOCUMENTS

| | | | |
|---|---|---|---|
| 6,496,971 B1 | 12/2002 | Lesea et al. | |
| 8,345,703 B2 | 1/2013 | Heinkel et al. | |
| 10,282,864 B1* | 5/2019 | Kim | G06T 9/002 |
| 10,379,887 B2* | 8/2019 | Spracklen | G06F 11/348 |
| 10,585,703 B2* | 3/2020 | Rossi | G06F 9/50 |
| 10,804,930 B2* | 10/2020 | Constantinescu | H03M 7/3077 |
| 10,929,612 B2* | 2/2021 | Jung | G06F 40/30 |

(Continued)

FOREIGN PATENT DOCUMENTS

| CN | 107239829 A | 10/2017 |
|---|---|---|
| JP | 2012-216188 A | 11/2012 |

(Continued)

OTHER PUBLICATIONS

Taiwanese Office Action dated May 30, 2023 for corresponding TW Patent Application No. 108136017.

*Primary Examiner* — Michael S Osinski
(74) *Attorney, Agent, or Firm* — Harness, Dickey & Pierce, P.L.C.

(57) ABSTRACT

Provided is a neural processing unit that performs application-work including a first neural network operation, the neural processing unit includes a first processing core configured to execute the first neural network operation, a hardware block reconfigurable as a hardware core configured to perform hardware block-work, and at least one processor configured to execute computer-readable instructions to distribute a part of the application-work as the hardware block-work to the hardware block based on a first workload of the first processing core.

11 Claims, 14 Drawing Sheets

(56) References Cited

U.S. PATENT DOCUMENTS

| | | | |
|---|---|---|---|
| 11,222,256 B2* | 1/2022 | Teng | G06N 3/08 |
| 11,256,990 B2* | 2/2022 | Lanctot | G06N 3/084 |
| 11,468,331 B2* | 10/2022 | Yamamoto | G06N 3/084 |
| 11,487,846 B2* | 11/2022 | Mills | G06F 17/16 |
| 2017/0206176 A1 | 7/2017 | Rahman et al. | |
| 2017/0249551 A1* | 8/2017 | Iljazi | H03M 13/3761 |
| 2018/0039886 A1* | 2/2018 | Umuroglu | G06N 3/08 |
| 2018/0041214 A1 | 2/2018 | Martin et al. | |
| 2018/0129893 A1* | 5/2018 | Son | G06V 10/95 |
| 2018/0300634 A1* | 10/2018 | McBride | H03M 7/6058 |
| 2019/0043185 A1* | 2/2019 | Hwang | G06K 9/6292 |
| 2019/0114534 A1* | 4/2019 | Teng | G06N 3/063 |
| 2019/0187775 A1* | 6/2019 | Rotem | G06F 1/3287 |
| 2019/0279478 A1* | 9/2019 | Ebata | G06T 7/254 |
| 2019/0310864 A1* | 10/2019 | Gutierrez | G06N 3/063 |
| 2020/0089559 A1* | 3/2020 | Ainsworth | G06F 11/1629 |
| 2020/0111005 A1* | 4/2020 | Ghosh | G06N 3/084 |
| 2020/0151549 A1* | 5/2020 | Hwang | G06F 7/5443 |

FOREIGN PATENT DOCUMENTS

| | | |
|---|---|---|
| JP | 2018-005762 A | 1/2018 |
| KR | 10-2003-0057806 A | 7/2003 |

* cited by examiner

NEURAL PROCESSING UNIT, NEURAL PROCESSING SYSTEM, AND APPLICATION SYSTEM

CROSS-REFERENCE TO RELATED APPLICATION

This application claims the benefit under 35 U.S.C. § 119 of Korean Patent Application No. 10-2018-0137345, filed on Nov. 9, 2018, in the Korean Intellectual Property Office, the disclosure of which is incorporated herein in its entirety by reference.

BACKGROUND

1. Field of the Disclosure

The present disclosure relates to a neural processing unit, a neural processing system, and an application system, and more particularly, to a neural processing unit, a neural processing system, and an application system including a reconfigurable hardware block.

2. Description of the Related Art

A processing core such as a CPU (Central Processing Unit) or a GPU (Graphic Processing Unit) may be used to execute a DNN (Deep Neural Network) operation. As the throughput of the DNN operation increases, a NPU (Neural Processing Unit) may be used to perform the DNN operation quickly.

The DNN operation may be subdivided to a CNN (Convolutional Neural Network) operation, a RNN (Recurrent Neural Network) operation and the like. The NPUs with different hardware structures may be used depending on the type of DNN operation. For example, the hardware structure of the NPU for performing the CNN operation may be different from the hardware structure of the NPU for performing the RNN operation.

A plurality of kinds of DNN operations may be performed in a particular application (e.g., application-work). For example, both the CNN operation and the RNN operation may both be performed in single application.

In a case where the NPU only has a hardware structure for performing one kind of DNN operation, another type of DNN operation may not be performed or may be performed with high delay. In addition, even when the NPU has a hardware structure for performing a plurality of kinds of DNN operations, the time taken for performing the application-work may be delayed depending on the amount of DNN operations included in the application-work. For example, the NPU may have one CNN processing core and one RNN processing core. If the amount of CNN operation and the amount of RNN operation included in the application-work performed by the NPU are different from each other (e.g., many CNN operations and few RNN operations), resources may be wasted. That is, one processing core may complete execution of the operation earlier than the other processing core and become idle. Completion of the application-work may be delayed until the operation of the other processing core is completed.

Therefore, in order to process the application-work quickly and prevent or reduce waste of resources, a neural processing unit, a neural processing system and an application system having heterogeneity for contemporaneously processing two or more neural network operations, and reconfigurability, which is an ability of the hardware to be reconfigured for processing the two or more neural network operations, would be desirable.

SUMMARY

Aspects of the present disclosure provide a neural processing unit, a neural processing system and an application system having heterogeneity and reconfigurability to quickly process the application-work and to prevent or reduce resource waste.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a neural processing unit configured to perform application-work including a first neural network operation. The neural processing unit includes a first processing core configured to execute the first neural network operation, a hardware block reconfigurable as a hardware core configured to perform hardware block-work, and at least one processor configured to execute computer-readable instructions to distribute a part of the application-work as the hardware block-work to the hardware block based on a first workload of the first processing core.

According to an aspect of the present disclosure, there is provided a neural processing unit including a hardware block reconfigurable as a first hardware core configured to execute an operation of a first neural network, or a second hardware core configured to execute a operation of a second neural network different from the first neural network, and an internal memory storing function data used to execute the operation of the first neural network or the operation of the second neural network.

According to an aspect of the present disclosure, there is provided a neural processing system including an external memory storing meta data usable for reconfiguring a hardware block, and a neural processing unit including a first processing core and the hardware block, the first processing core being configured to perform an operation of a first neural network.

According to an aspect of the present disclosure, there is provided an application system including a central processing unit (CPU) configured to execute computer-readable instructions to perform one or more operations for execution of an application, and distribute a first application-work among a set of application-work to be performed in for execution of the application, the first application-work including a first neural network operation, a neural processing unit including a first processing core and a hardware block, the neural processing unit being configured to perform the first application-work using the first processing core and the hardware block, the first processing core being configured to execute the first neural network operation, and a reconfiguration loader configured to transfer meta data to the neural processing unit, the meta data being usable for reconfiguring the hardware block.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF EMBODIMENTS

A neural processing unit according to some embodiments of the present application will be described with reference to FIGS. 1 to 4. FIGS. 1 to 4 are block diagrams of the neural processing unit according to some embodiments of the present application.

Figure 1:
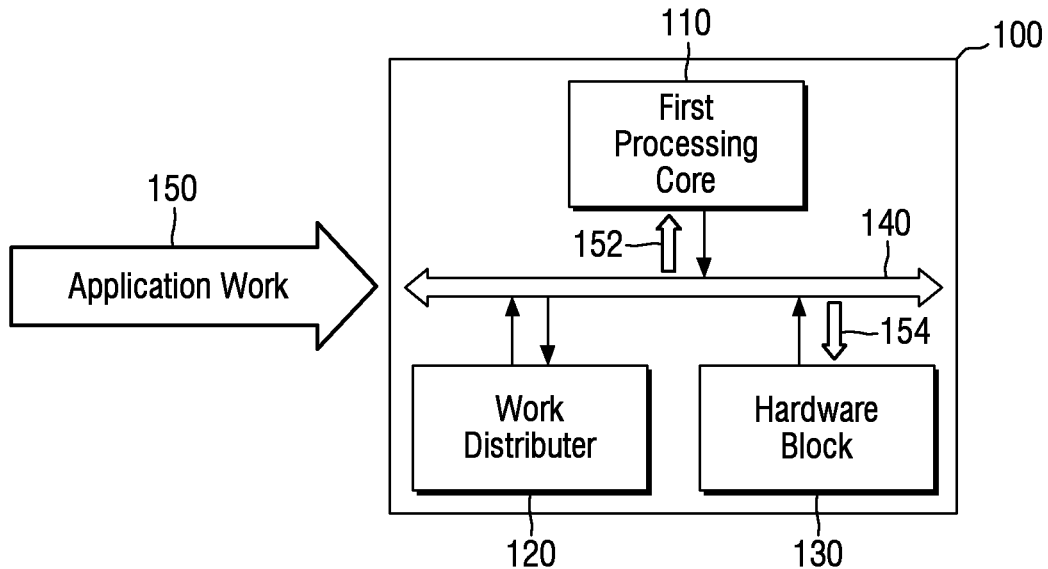
FIG. 1 is a block diagram of a neural processing unit according to some embodiments.

Referring to FIG. 1, a neural processing unit 100 according to some embodiments of the present application may include a first processing core 110, a work distributer 120, a hardware block 130 and/or a bus 140.

The neural processing unit 100 may perform an application-work 150 (e.g., neural network operations to be performed in a particular application). According to some example embodiments, the application-work 150 may include one or more machine codes and/or native instructions that may specify particular registers and/or arithmetic, addressing and/or control functions corresponding to registers and/or functions of the neural processing unit 100. The application-work 150 may include a first processing core-work 152 or a hardware block-work 154. The first processing core-work 152 may be performed by the first processing core 110 to be described below. The hardware block-work 154 may be performed by the hardware core to be described below. Here, the hardware core may mean a CNN processing hardware core 132, an RNN processing hardware core 134, an MAC (Multiply and Accumulate) processing hardware core 136 for executing an MAC operation, and the like described later referring to FIGS. 2 through 4 which are reconfigured from the hardware block 130, but the scope of the present disclosure is not limited thereto.

The first processing core 110 may perform a first neural network operation. That is, the first processing core-work 152 may include the first neural network operation. For example, the first neural network operation may be a CNN (Convolutional Neural Network) operation, and the first processing core 110 may be a CNN IP (intellectual property) core for processing the CNN operation. Also, the first neural network operation may be a RNN (Recurrent Neural Network) operation, and the first processing core 110 may be a RNN IP core for processing the RNN operation. In this way, in the present specification, the CNN operation and the RNN operation have been described as an example of the first neural network operation, but the scope of the present disclosure is not limited thereto.

The work distributer 120 may distribute a part of the application-work 150 as hardware block-work 154 to the hardware block 130 (distributions as hardware block-work 154 to the hardware block 130 is also referred to herein as distribution "to the hardware block-work 154"). The work distributer 120 may distribute a part of the application-work 150 to the hardware block-work 154 in accordance with a first workload of the first processing core 110. For example, the work distributer 120 may receive the first workload from the first processing core 110 via the bus 140. In addition, the work distributer 120 may distribute a part of the application-work 150 to the hardware block-work 154 in accordance with the first workload.

In some embodiments, the work distributer 120 may distribute the application-work 150, which is input to the neural processing unit 100, to the first processing core 110 and/or the hardware block 130. For example, the work distributer 120 may distribute the first neural network operation as first processing core-work 152 to the first processing core 110 (distributions as first processing core-work 152 to the first processing core 110 is also referred to herein as distribution "to the first processing core-work 152") and may distribute the remaining operations of the application-work 150 to the hardware block-work 154.

In some embodiments, the work distributer 120 may distribute a part of the first processing core-work 152 to the hardware block-work 154, depending on whether the first workload exceeds a predefined (or defined) value. For example, if the first workload exceeds the predefined value, the work distributer 120 may distribute a part of the first processing core-work 152 to the hardware block-work 154. In an embodiment, a part of the first neural network operation included in the first processing core-work 152 may be distributed to the hardware block-work 154. Also, if the first workload does not exceed the predefined value, the work distributer 120 may not distribute a part of the first processing core-work 152 to the hardware block-work 154. In an embodiment, the work distributer 120 may distribute other (non-first processing core-work 152) operations included in the application-work 150 to the hardware block-work 154.

The work distributer 120 may be hardware. For example, the work distributer 120 may be, but is not limited to, a separate IP core. Also, the work distributer 120 may be software. For example, the neural processing unit 100 may include a general processing core that executes remaining general works except the first processing core-work 152 and the hardware block-work 154 among the application-works 150, and the work distributer 120 may be software executed by the general processing core. According to some example embodiments, operations described herein as being performed by either or both of the neural processing unit 100 and the work distributer 120 may be performed by at least one processor (e.g., the general processing core) executing program code that includes instructions corresponding to the operations. The instructions may include one or more machine codes and/or native instructions that may specify particular registers and/or arithmetic, addressing and/or control functions corresponding to registers and/or functions of the neural processing unit 100 and/or the work distributor 120. The instructions may be stored in a memory of the neural processing unit 100 (e.g., the internal memory 160 discussed below). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The hardware block 130 may be reconfigured as a hardware core for performing the hardware block-work 154. That is, the hardware block 130 may be reconfigured as a hardware core having a structure for executing the hardware block-work 154 in accordance with the hardware block-work 154. If the work distributor 120 distributes the first neural network operation to the hardware block-work 154, the hardware block 130 may be reconfigured as a hardware core for processing the first neural network operation. If the work distributor 120 distributes a second neural network operation different from the first neural network to the hardware block-work 154, the hardware block 130 may be reconfigured as a hardware core for processing the second neural network operation.

As an example, when the hardware block-work 154 is a CNN (Convolutional Neural Network) operation, the hardware block 130 may be reconfigured as a CNN processing hardware core 132 to be described below in FIG. 2. As another example, when the hardware block-work 154 is an RNN (Recurrent Neural Network) operation, the hardware block 130 may be reconfigured as an RNN processing hardware core 134 to be described later in FIG. 3. Further, as another example, when the hardware block-work 154 is a MAC (Multiply and Accumulate) operation, the hardware block 130 may be reconfigured as a MAC processing hardware core 136 for executing a MAC operation to be described later in FIG. 4.

In some embodiments, the hardware block 130 may be reconfigured as a hardware core for executing the hardware block-work 154 while the neural processing unit 100 executes an application-work. For example, while the neural processing unit 100 executes the application-work, the work distributor 120 may sequentially distribute the first neural network operation and a second neural network operation different from the first neural network to the hardware block-work 154. At this time, the hardware block 130 may be sequentially reconfigured as the first hardware core for processing the first neural network operation and the second hardware core for processing the second neural network operation.

According to some example embodiments, operations described herein as being performed by either or both of the first processing core 110 and the hardware block 130 (and the configured hardware core of the hardware block 130, e.g., the CNN processing hardware core 132, the RNN processing hardware core 134 and/or the MAC processing hardware core 136, as discussed below) may be performed by at least one processor executing program code that includes instructions corresponding to the operations. The instructions may include one or more machine codes and/or native instructions that may specify particular registers and/or arithmetic, addressing and/or control functions corresponding to registers and/or functions of the first processing core 110 and/or the hardware block 130. The instructions may be stored in a memory. For example, either or both of the first processing core 110 and the hardware block 130 may include logic blocks that are programmed in a hardware description language (e.g., Verilog). As an example, either or both of the first processing core 110 and the hardware block 130 may be an FPGA (Field Programmable Gate Array). As another example, the neural processing unit may be an eFPGA (embedded FPGA), and either or both of the first processing core 110 and the hardware block 130 may be a FPGA block included in the eFPGA. In some example embodiments, operations described herein as being performed by either or both of the neural processing unit 100 and the work distributor 120 may be performed by at least one first processor executing first program code that includes instructions corresponding to the operations; operations described herein as being performed by the first processing core 110 may be performed by at least one second processor executing second program code that includes instructions corresponding to the operations; and operations described herein as being performed by the hardware block 130 may be performed by at least one third processor executing third program code that includes instructions corresponding to the operations the first processing core 110. The first program code, the second program code and/or the third program code may be stored in a memory of the neural processing unit 100 (e.g., the internal memory 160). In an embodiment, the second program code may be stored in a memory of the first processing core 110 and the third program code may be stored in a memory of the hardware block 130.

The bus 140 may be a path for moving data between the work distributor 120, the first processing core 110, and/or the hardware block 130. The bus 140 may be a path for transferring the application-work 150 of the neural processing unit 100 to the work distributor 120. The bus 140 may be a path for transferring the first processing core-work 152 and/or the hardware block-work 154 distributed from the work distributor 120 to the first processing core 110 and/or the hardware block 130.

Figure 2:
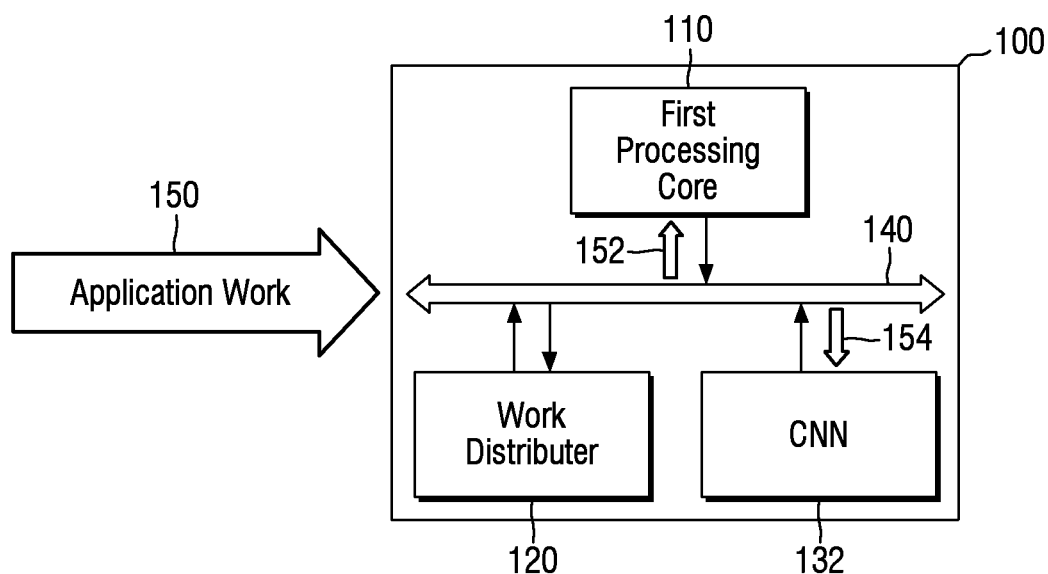
FIG. 2 is a block diagram of the neural processing unit according to some embodiments.

Referring to FIG. 2, the hardware block 130 of FIG. 1 may be reconfigured as the CNN (Convolutional Neural Network) processing hardware core 132. For example, if the hardware block-work 154 distributed from the work distributer 120 is a CNN operation, the hardware block 130 may be reconfigured as the CNN processing hardware core 132 for processing the CNN operation. The CNN operation may include, for example, a neural network operation relating to image recognition processing. For example, the CNN operation may include a neural network operation for recognizing characters, people, objects, and/or the like in an image.

Figure 3:
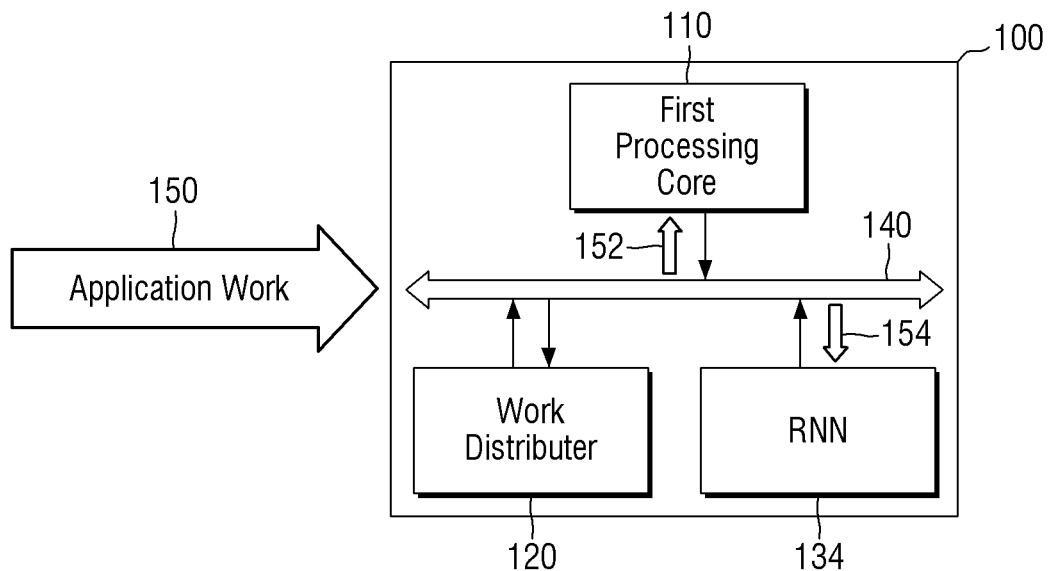
FIG. 3 is a block diagram of the neural processing unit according to some embodiments.

Referring to FIG. 3, the hardware block 130 of FIG. 1 may be reconfigured as a RNN (Convolutional Neural Network) processing hardware core 134. For example, if the hardware block-work 154 distributed from the work distributer 120 is an RNN operation, the hardware block 130 may be reconfigured as an RNN processing hardware core 134 for processing the RNN operation. The RNN operation may include, for example, a neural network operation relating to a voice recognition process. For example, the RNN operation may include the neural network operation for recognizing characters, music, sound sources, and/or the like from voice (e.g., detected and/or recorded audio).

Figure 4:
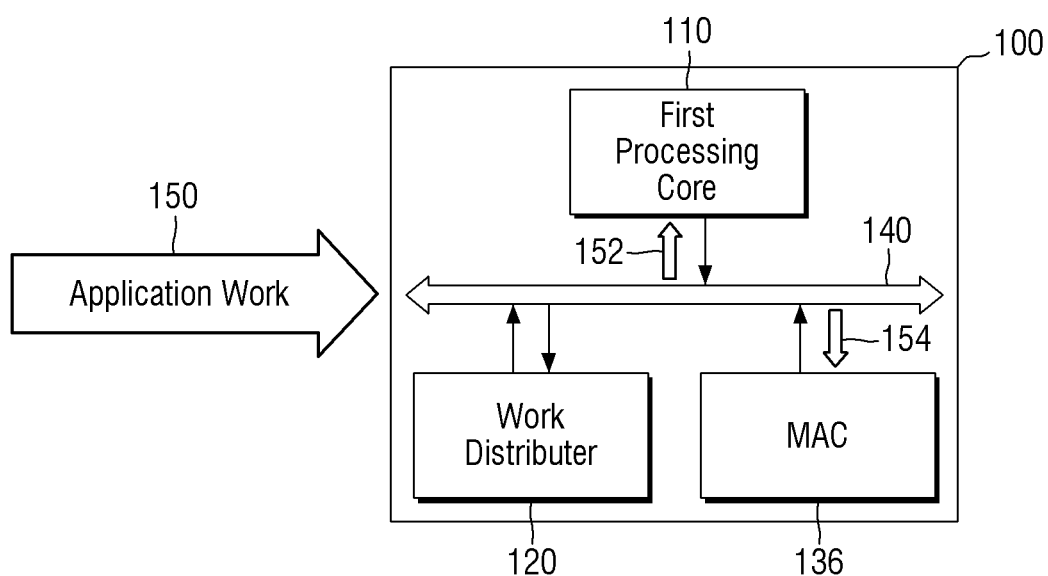
FIG. 4 is a block diagram of the neural processing unit according to some embodiments.

Referring to FIG. 4, the hardware block 130 may be reconfigured as a MAC processing hardware core 136 that performs the MAC operation. In some embodiments, the first neural network operation may include a first MAC (Multiply and Accumulate) operation. The work distributer 120 distributes a part of the first MAC operation to the hardware block-work, on the basis of a ratio of the first MAC operation to the first workload of the first processing core 110. In an embodiment, the ratio of the first MAC operation to the first workload is a ratio of the quantity of operations and/or instructions included in the first MAC operation to the quantity of operations and/or instructions included in the first workload. In an embodiment, the ratio of the first MAC operation to the first workload is a ratio of the data size of the first MAC operation to the data size of the first workload. As an example, if the ratio of the first MAC operation to the first workload of the first processing core 110 exceeds a predefined (or defined) value, the work distributor 120 may distribute a part of the first MAC operation to the hardware block-work 154. For example, when the predefined value is 0.4 and the ratio of the first MAC operation to the first workload is 0.6, the work distributor 120 may divide a part of the first MAC operation to the hardware block-work 154. In an embodiment, the hardware block 130 may be reconfigured as a MAC processing hardware core 136 for executing the first MAC operation. As another example, when the ratio of the first MAC operation to the first workload of the first processing core 110 does not exceed a predefined (or defined) value, the work distributer 120 may not distribute a part of the first MAC operation to the hardware block-work 154. In an embodiment, the hardware block 130 may not be reconfigured as the MAC processing hardware core 136.

The MAC processing hardware core 136 may execute, for example, the MAC operation for operating the sum of the weighted input values $(X_1 * W_{X1} + X_2 * W_{X2} + \ldots + X_m * W_{Xm})$ from a series of input values $(X_1, X_2, \ldots, X_m)$ and a series of weighted values $(W_{X1}, W_{X2}, \ldots, W_{Xm})$. In some embodiments, the MAC processing hardware core 136 may include a multiplier that performs a multiplication operation and/or an adder that performs an addition operation. According to some example embodiments, operations described herein as being performed by either or both of the multiplier and the adder may be performed by at least one processor executing program code that includes instructions corresponding to the operations. The instructions may be stored in a memory.

The multiplier may operate (e.g., determine and/or calculate) the weighted input values $(X_1 * W_{X1}, X_2 * W_{X2}, \ldots, X_m * W_{Xm})$ from the input values $(X_1, X_2, \ldots, X_m)$ and the series of weighted values $(W_{X1}, W_{X2}, \ldots, W_{Xm})$. As an example, the multiplier of the MAC processing hardware core 136 may include a multiplier that directly multiplies a series of input values $(X_1, X_2, \ldots, X_m)$ with a series of weighted values $(W_{X1}, W_{X2}, \ldots, W_{Xm})$, respectively. As another example, the multiplier of the MAC processing hardware core 136 may include a look-up table including quantized weighted data as described in detail in FIGS. 5 to 7.

The adder may operate (e.g., determine and/or calculate) the sum $(X_1 * W_{X1} + X_2 * W_{X2} + \ldots + X_m * W_{Xm})$ of the weighted input values from the weighted input values $(X_1 * W_{X1}, X_2 * W_{X2}, \ldots, X_m * W_{Xm})$.

Figure 5:
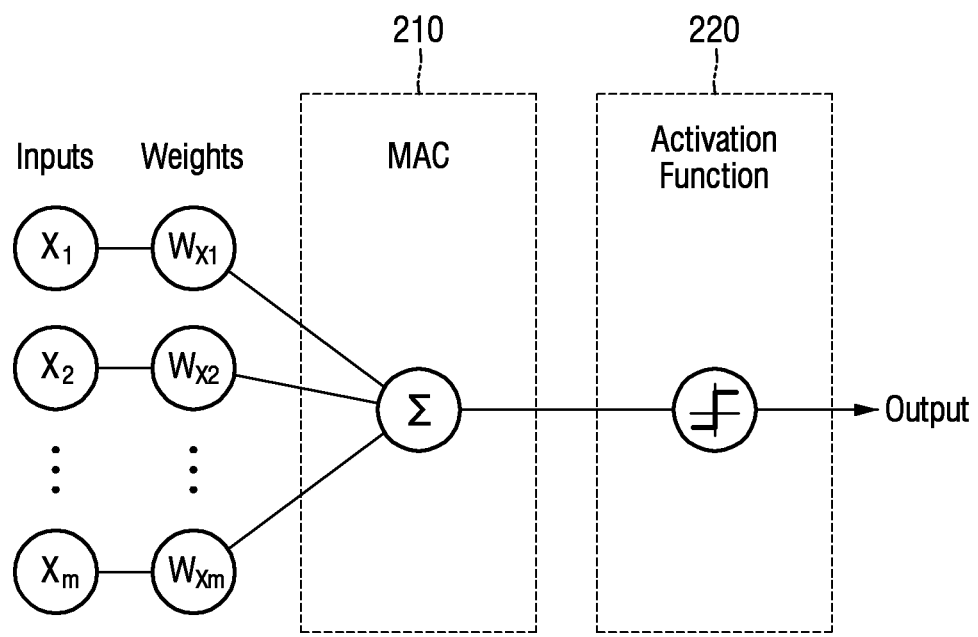
FIG. 5 is a block diagram illustrating a DNN (Deep Neural Network) operation according to some embodiments.
Figure 6:
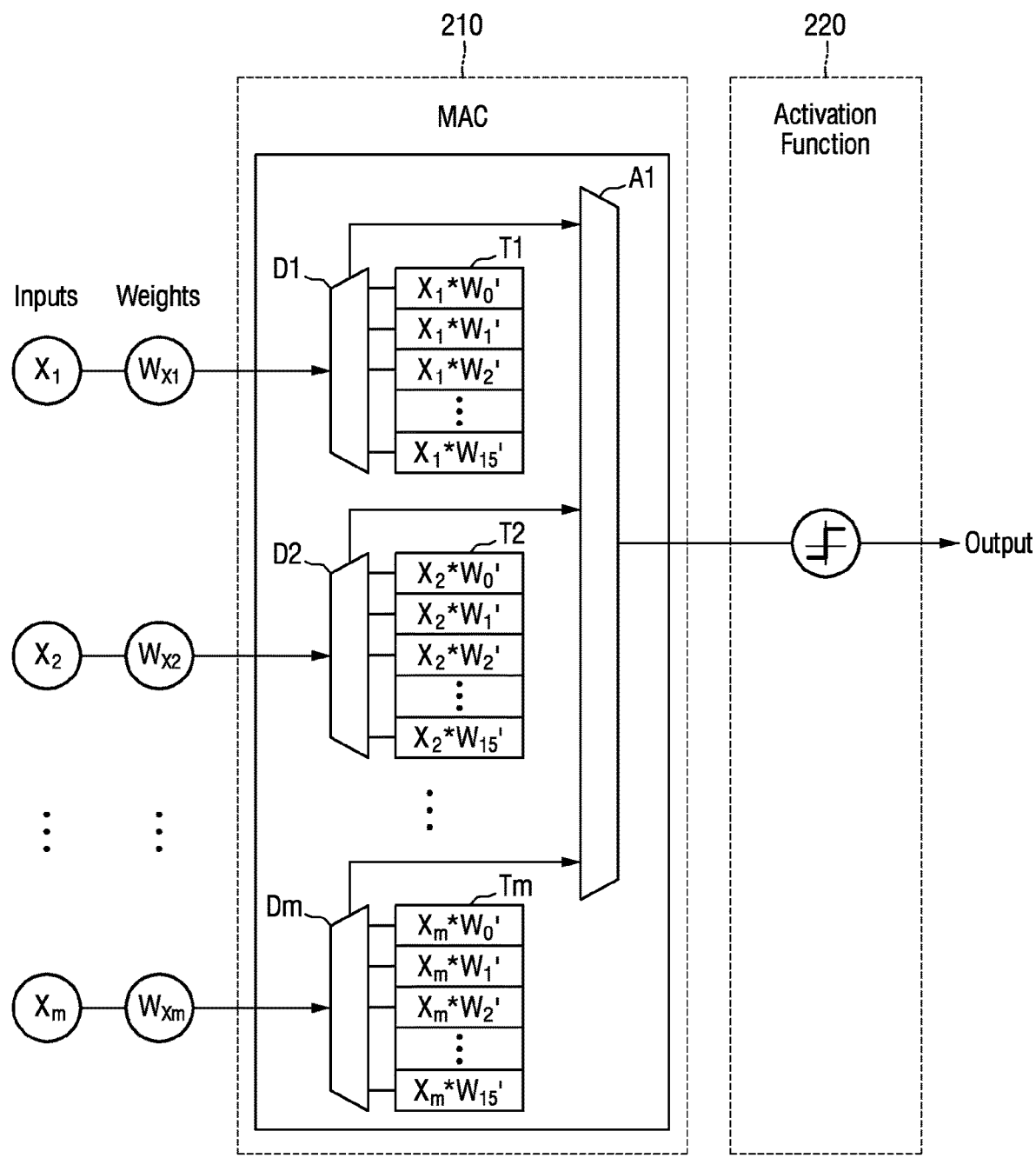
FIG. 6 is a block diagram of the DNN operation according to some embodiments.

The MAC processing hardware core 136 of the neural processing unit according to some embodiments of the present application will be described referring to FIGS. 5 and 6. For convenience of explanation, differences from those described in FIGS. 1 to 4 will be mainly described. FIGS. 5 and 6 are block diagrams illustrating a DNN (Deep Neural Network) operation according to some embodiments.

Referring to FIG. 5, the DNN operation includes a MAC operation 210 and/or an activation function operation 220.

The MAC operation 210 may operate (e.g., determine and/or calculate) the sum $(X_0 * W_{X0} + X_1 * W_{X1} + \ldots + X_m * W_{Xm})$ of the weighted input values from the input values $(X_1, X_2, \ldots, X_m)$ and a series of weighted values $(W_{X1}, W_{X2}, \ldots, W_{Xm})$. According to some embodiments of the present application, the MAC operation 210 may be executed by the MAC processing hardware core 136 of the neural processing unit 100.

The activation function operation 220 may operate an activation function output value $f(\Sigma X_i W_i)$ on the basis of the input value $\Sigma X_i W_i$. For example, the activation function used for the activation function operation 240 may include a sigmoid function, a tanh (hyperbolic tangent) function, a ReLU (Rectified Linear Unit) function and/or the like, but the scope of the present disclosure is not limited thereto. According to some embodiments of the present application, the activation function operation 220 may be executed by the MAC processing hardware core 136 using information from an internal memory 160 to be described below with reference to FIG. 9.

Referring to FIG. 6, the MAC processing hardware core 136 according to some embodiments of the present application may include first to m-th demultiplexers (demuxes) (D1, ..., Dm), first to m-th look-up tables (T1, ..., Tm), and/or an adder A1. According to some example embodiments, operations described herein as being performed by any or all of the first to m-th demultiplexers and the adder A1 may be performed by at least one processor executing program code that includes instructions corresponding to the operations. The instructions and/or the first to m-th look-up tables (T1, ..., Tm) may be stored in a memory.

The first to m-th demuxes (D1, ..., Dm) may determine indices of corresponding weighted values. For example, a first demux D1 may determine a first index $(Id_{X1}=2)$ of the first weighted value $W_{X1}$ of the first input value $X_1$. A second demux D2 may determine an index $(Id_{X2}=0)$ of the second weighted value $W_{X2}$ of the second input value $X_2$. A m-th demux Dm may determine an index $(Id_{Xm}=1)$ of the m-th weighted value $W_{Xm}$ of the m-th input value $X_m$. The index of the weighted value will be described below in detail in FIG. 7.

The first to m-th look-up tables (T1, ..., Tm) may include multiplied values of the input data and the quantized series of weighted values. For example, the first look-up table T1 may include multiplied values $(X_1 * W'_0, X_1 * W'_1, \ldots, X_1 * W'_{15})$ of the first input data $X_1$ and the quantized series of weighted values $(W'_0, W'_1, \ldots, W'_{15})$. The second look-up table T2 may include multiplied values $(X_2 * W'_0, X_2 * W'_1, \ldots, X_2 * W'_{15})$ of the second input data $X_2$ and the quantized series of weighted values $(W'_0, W'_1, \ldots, W'_{15})$. The m-th look-up table Tm may include multiplied values $(X_m * W'_0, X_m * W'_1, \ldots, X_m * W'_{15})$ of the m-th input data $X_m$ and the quantized series of weighted values $(W'_0, W'_1, \ldots, W'_{15})$. A series of quantized weighted values will be described in detail below with reference to FIG. 7.

The first to m-th demuxes (D1, ..., Dm) may transmit the quantized data corresponding to the determined indices of the first to m-th look-up tables (T1, ..., Tm) to the adder A1. For example, the first demux D1 may transmit "a value $(X_1 * W'_2)$ obtained by multiplying the input data $X_1$ by the quantized weighted data $W'_2$" corresponding to the first index $(Id_{X1}=2)$ of the first look-up table T1 to the adder A1. The second demux D2 may transmit "a value $(X_2 * W'_0)$ obtained by multiplying the input data $X_s$ by the quantized weighted data $W'_0$" corresponding to the second index ($Id_{x2}$=0) of the second look-up table T2 to the adder A1. The m-th demux Dm may transmit "a value ($X_m*W'_1$) obtained by multiplying the input data $X_m$ by the quantized weighted data $W'_1$" corresponding to the m-th index ($Id_{Xm}$=1) of the m-th look-up table Tm to the adder A1.

The adder A1 may operate (e.g., determine and/or calculate) the sum ($X_1*W'_2+X_2*W'_0+X_m*W'_1$) of the weighted data ($X_1*W'_2, X_2*W'_0, \ldots, X_m*W'_1$) transmitted from the first to m-th demuxes (D1, . . . , Dm). The resulting value from the adder A1 may be input to the activation function operation 220.

In this way, when the hardware block 130 of the neural processing unit 100 according to some embodiments of the present application is reconfigured as the MAC processing hardware core 136 that executes the MAC operation, using the look-up table including the quantized weighted data, it is possible to omit the multiplication operation of the input values and the weighted values executed in the general MAC operation. Therefore, the neural processing unit 100 according to some embodiments of the present application may quickly process the application-work 150 and may save resources.

Figure 7:
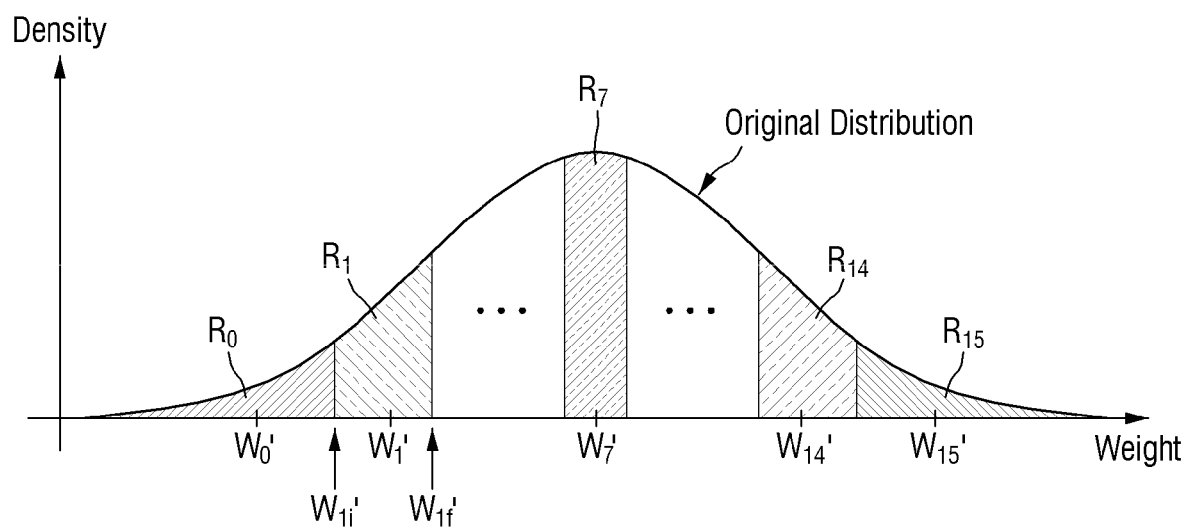
FIG. 7 is a diagram illustrating a quantized weighted data.

The index of the quantized weighted data and the weighted value will be described with reference to FIG. 7. FIG. 7 is a diagram for explaining the quantized weighted data. In the graph illustrated in FIG. 7, a horizontal axis indicates the magnitude of the weighted value, and a vertical axis indicates the distribution of the weighted value (e.g., density). The weighted values of FIG. 7 are illustrated as conforming to a normal distribution, but embodiments are not limited thereto.

Referring to FIG. 7, the distribution of weighted values may include a plurality of regions. For example, the distribution of weighted values may include 0-th to fifteenth regions ($R_0, R_1, \ldots, R_{15}$) having the same width. Also, the distribution of the weighted values may include 128 regions having the same width.

Each of the plurality of regions ($R_0, R_1, \ldots, R_{15}$) may include one quantized weighted data ($W'_0, W'_1, \ldots, W'_{15}$). As an example, the quantized weighted data ($W'_0, W'_1, \ldots, W'_{15}$) may be a median value in each region. That is, when the horizontal axis of the region $R_1$ is in the range from $W'_{1i}$ to $W'_{1f}$, the width of the region from $W'_{1i}$ to $W'_1$ may be the same as the width of the region from $W'_1$ to $W'_{1f}$. As another example, the quantized weighted data ($W'_0, W'_1, \ldots, W'_{15}$) may be a mean value in each region. That is, when the horizontal axis of the region $R_1$ is in the range from $W'_{1i}$ to $W'_{1f}$, $W'_1$ may be ($W'_{1i}+W'_{1f}$)/2. Referring again to FIG. 6, the first to m-th demuxes (D1, . . . , Dm) of the MAC processing hardware core 136 may determine the indexes of the weighted values ($W_{X1}, W_{X2}, \ldots, W_{Xm}$) of each of the input values ($X_1, X_2, \ldots, X_m$). For example, the first demux D1 may determine the index on the basis of which region among the plurality of regions of the distribution of weighted values illustrated in FIG. 7 the first weighted value $W_{X1}$ of the first input value $X_1$ is included. For example, when the first weighted value $W_{X1}$ is included in the second region $R_2$, the first index $Id_{X1}$ may be determined as 2. When the second weighted value $W_{X2}$ is included in the 0-th region $R_0$, the second index $Id_{X1}$ may be determined as 0. When the m-th weighted value $W_{Xm}$ is included in the first region $R_1$, the m-th index $Id_{Xm}$ may be determined as 1.

Figure 8:
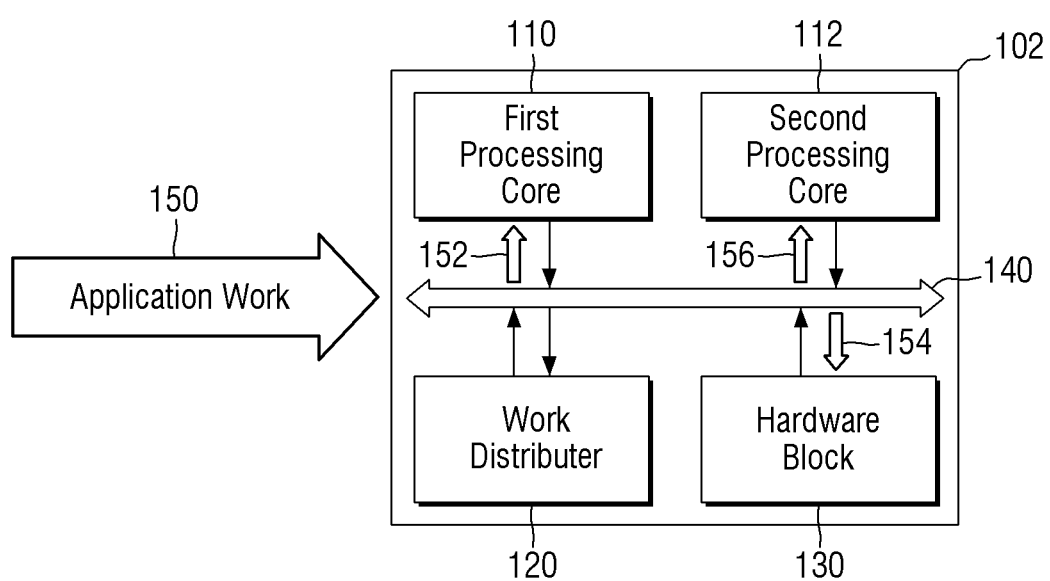
FIG. 8 is a block diagram of the neural processing unit according to some embodiments.

Hereinafter, the neural processing unit according to some embodiments of the present application will be described referring to FIG. 8. For the sake of convenience of explanation, differences from those described in FIGS. 1 to 7 will be mainly described. FIG. 8 is a block diagram of the neural processing unit according to some embodiments.

Referring to FIG. 8, a neural processing unit 102 according to some embodiments of the present application may include a first processing core 110, a second processing core 112, a work distributer 120, a hardware block 130, and/or a bus 140. According to some example embodiments, operations described herein as being performed by the second processing core 112 may be performed by at least one processor executing program code that includes instructions corresponding to the operations. The instructions may include one or more machine codes and/or native instructions that may specify particular registers and/or arithmetic, addressing and/or control functions corresponding to registers and/or functions of the second processing core 112. The instructions may be stored in a memory. For example, the second processing core 112 may include logic blocks that are programmed in a hardware description language (e.g., Verilog). As an example, the second processing core 112 may be an FPGA (Field Programmable Gate Array). As another example, the neural processing unit may be an eFPGA (embedded FPGA), and the second processing core 112 may be a FPGA block included in the eFPGA. In some example embodiments, operations described herein as being performed by the second processing core 112 may be performed by at least one fourth processor executing fourth program code that includes instructions corresponding to the operations. The fourth program code may be stored in a memory of the neural processing unit 100 (e.g., the internal memory 160) and/or a memory of the second processing core 112.

The neural processing unit 102 may perform an application-work 150. The application-work 150 may include a first processing core-work 152, a second processing core-work 156 and/or a hardware block-work 154. The second processing core-work 156 may be executed by the second processing core 112 to be described below.

The second processing core 112 may perform a second neural network operation. That is, the second processing core-work 156 may include the second neural network operation. For example, the second neural network operation may be a CNN operation, and the second processing core 112 may be a CNN IP core for processing the CNN operation. In an embodiment, the second neural network operation may be an RNN operation, and the second processing core 112 may be an RNN IP core for processing the RNN operation. In this way, in the present specification, the CNN operation and/or the RNN operation have been described as an example of the second neural network operation, but the scope of the present disclosure is not limited thereto.

The second neural network operation may be a neural network operation of a type different from that of the first neural network operation. As an example, when the first neural network operation is a CNN operation, the second neural network operation may be an RNN operation. As another example, when the first neural network operation is an RNN operation, the second neural network operation may be a CNN operation.

The work distributer 120 may distribute a part of the application-work 150 to the hardware block-work 154. The work distributer 120 may distribute a part of the application-work 150 to the hardware block-work 154, on the basis of a first workload of the first processing core 110 and/or a second workload of the second processing core 112. For example, the work distributer 120 may receive the first workload from the first processing core and the second workload from the second processing core 112 via the bus 140. Also, the work distributer 120 may distribute a part of the application-work 150 to the hardware block-work 154 on the basis of the received first workload and second workload.

In some embodiments, the work distributer 120 may distribute the application-work 150, which is input to the neural processing unit 102, to the first processing core 110, the second processing core 112, and/or the hardware block 130. For example, the work distributer 120 may distribute the first neural network operation to the first processing core-work 152, distribute the second neural network operation to the second processing core-work 156, and distribute the remaining operations among the application-work 150 to the hardware block 130 as a hardware block-work 154.

In some embodiments, the work distributer 120 may distribute a part of the first processing core-work 152 and/or a part of the second processing core-work 156 to the hardware block-work 154, on the basis of the first workload and/or the second workload. For example, the work distributer 120 may compare the amount of the first workload with the amount of the second workload to distribute a part of the first processing core-work 152 or a part of the second processing core-work 156 to the hardware block-work 154. In an embodiment, the amount of each workload compared by the work distributer 120 includes at least one of a quantity of operations and/or instructions included in the workloads, and/or a data size of each workload. As an example, if the work distributer 120 determines the amount of the first workload is greater than the amount of the second workload, the work distributer 120 may distribute a part of the first processing core-work 152 to the hardware block-work 154. In an embodiment, a part of the first neural network operation included in the first processing core-work 152 may be distributed to the hardware block-work 154. As another example, if the work distributer 120 determines the amount of the first workload is smaller than the amount of the second workload, the work distributer 120 may distribute a part of the second processing core-work 156 to the hardware block-work 154. In an embodiment, a part of the second neural network operation included in the second processing core-work 156 may be distributed to the hardware block-work 154.

Figure 9:
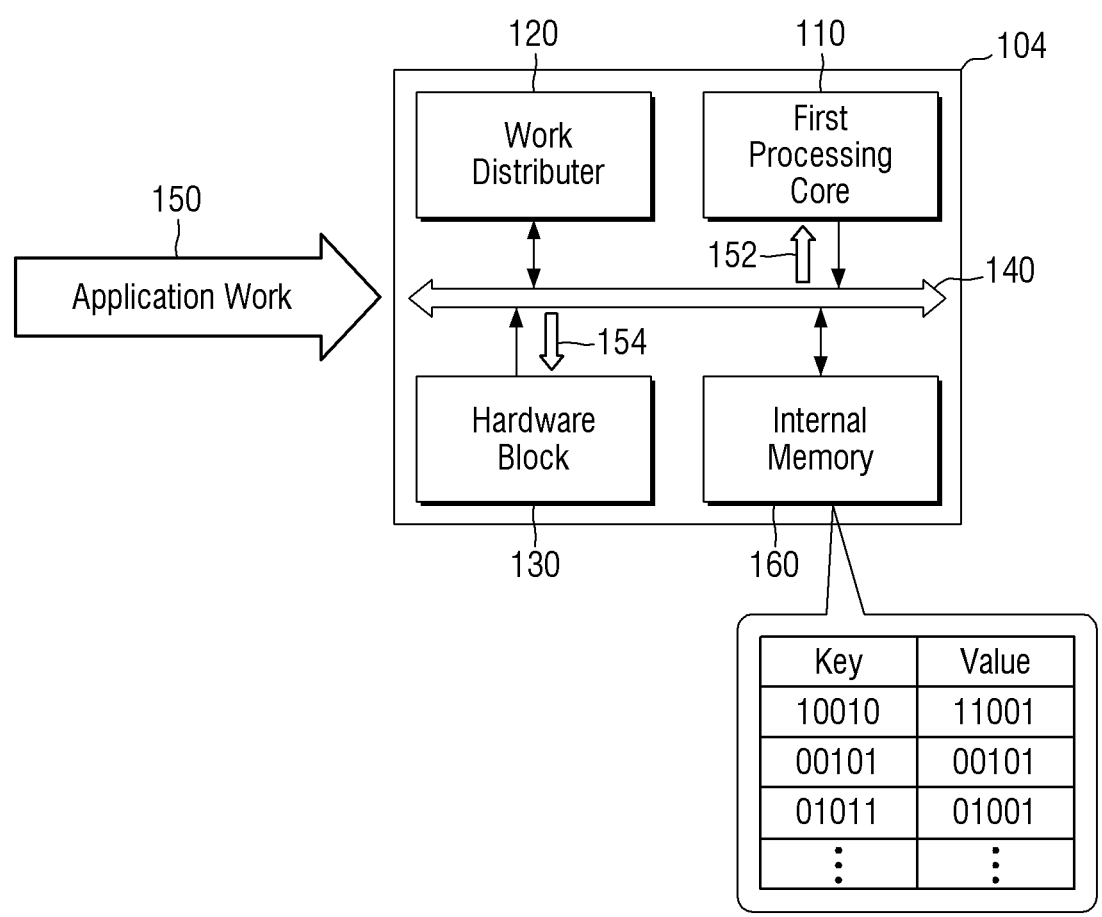
FIG. 9 is a block diagram of the neural processing unit according to some embodiments.

Hereinafter, the neural processing unit according to some embodiments of the present application will be described with reference to FIGS. 5 and 9. For convenience of explanation, differences from those described in FIGS. 1 to 8 will be mainly described. FIG. 9 is a block diagram of a neural processing unit according to some embodiments.

Referring to FIG. 9, a neural processing unit 104 according to some embodiments of the present application may include a first processing core 110, a work distributer 120, a hardware block 130, a bus 140, and/or an internal memory 160. According to some example embodiments, operations described herein as being performed by the internal memory 160 may be performed by at least one processor (e.g., the at least one first processor, the at least one second processor and/or the at least one third processor) executing program code that includes instructions corresponding to the operations. The instructions may be stored in a memory of the neural processing unit 100 (e.g., the internal memory 160), a memory of the first processing core 110 and/or a memory of the hardware block 130.

The internal memory 160 may store function data used in the neural network operation. For example, the internal memory 160 may store the function data used in the first neural network operation and/or the second neural network operation included in the first processing core-work 152 and/or the hardware block-work 154.

More specifically, the internal memory 160 may store function data of the activation function used in the activation function operation 220 of FIG. 5. The function data may include a key and a value of the activation function. The key is the input data (e.g., k) of the activation function, and the value may be the output data (e.g., f(k)) of the activation function. Therefore, by using the internal memory 160, it is possible to read the output data stored in advance, instead of directly executing the activation function operation in the DNN operation. This may effectively reduce the time taken for processing the DNN operation.

The internal memory 160 may store the function data of a plurality of activation functions. For example, the internal memory 160 may simultaneously or contemporaneously store the function data of the tanh function and the function data of the ReLU function. For example, when the Sigmoid function is used in the first neural network operation and the ReLU function is used in the second neural network operation, the internal memory 160 may store the function data of the Sigmoid function and the ReLU function.

In some embodiments, if the hardware block 130 is reconfigured as a first hardware core for executing the first neural network operation, the internal memory 160 may store the function data of the activation function used for the operation of the first neural network. Further, if the hardware block 130 is reconfigured as a second hardware core for executing the second neural network operation, the internal memory 160 may store the function data of the activation function used for the operation of the second neural network.

In some embodiments, the internal memory 160 may update the stored function data in accordance with the operation executed on the first processing core 110 and/or the hardware block 130. Also, when the hardware block 130 is reconfigured as the first hardware core or the second hardware core, the internal memory 160 may update the stored function data, in accordance with the operation executed in the first hardware core or the second hardware core. For example, if the hardware block 130 is configured as the first hardware core and an operation to be executed is an operation corresponding to the second hardware core, the internal memory 160 may update the stored function data to reconfigure the hardware block 130 as the second hardware core.

The internal memory 160 may delete the existing stored function data and store new function data from a memory arranged outside (e.g., external to) the neural processing unit 104 in order to update the stored function data. Also, the internal memory 160 may update the stored function data while the neural processing unit 104 executes the application-work.

In some embodiments, the internal memory 160 may be a CAM (Content-addressable memory). In some embodiments, the internal memory 160 may be a Binary-CAM or a TCAM (Ternary CAM).

Conventional neural processing units (NPU) include one or more hardware structures (e.g., cores) for performing one or more types of deep neural network (DNN) operation (e.g., CNN, RNN and/or MAC). Conventional NPUs are configured to minimize or reduce a quantity of hardware structures included therein to reduce costs, resource consumption, and/or NPU size and/or complexity. However, if a conventional NPU receives application-work for processing that involves a type of DNN operation for which the conventional NPU is not configured, the DNN operation may not be performed (e.g., an execution error may occur), and/or may be performed with high delay. Accordingly, a tradeoff exists between the higher cost, resource consumption, and/or NPU size and/or complexity resulting from configuring a conventional NPU to perform many types of DNN operations, and the high delay and/or execution errors caused by a conventional NPU configured to perform fewer types of DNN operations. Further, conventional NPUs including more than one hardware structure for performing more than one type of DNN operation experience excessive processing delay and/or resource wastage (e.g., inefficiency) in the event that received application-work involves many operations of a first type of DNN operation and few operations of a second type of DNN operation. For example, processing time of a second processing core configured to execute the second type of DNN operation is wasted as the second processing core becomes idle after performing the few operations while a first processing core configured to execute the first type of DNN operation remains overburdened performing the many operations.

However, example embodiments provide an improved NPU including a reconfigurable hardware block (e.g., the hardware block 130) capable of being reconfigured to perform different types of DNN operations. Accordingly, the improved NPU includes fewer hardware structures while enabling the improved NPU to process many types of DNN operations, thereby reducing costs, resource consumption, and/or NPU size and/or complexity, while also reducing the delay and/or execution errors of conventional NPUs. Also, the improved NPU may include a work distributer 120 that distributes application-work between the reconfigurable hardware block and one or more processing cores (e.g., first processing core 110) such that the reconfigurable hardware block performs a portion of a workload of the one or more processing cores to minimize or reduce idle time among the reconfigurable hardware block and the one or more processing cores. Thus, the improved NPU prevents or reduces excessive processing delay and/or resource wastage (e.g., inefficiency) of the conventional NPUs.

Figure 10:
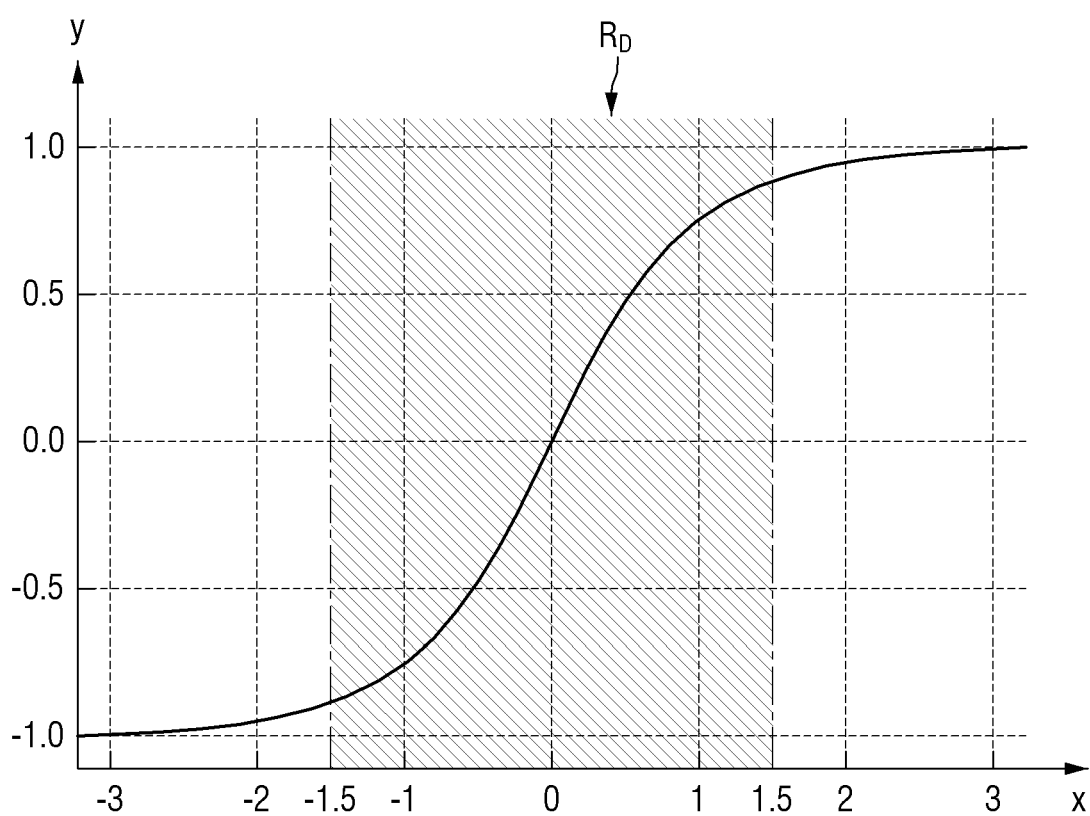
FIG. 10 is a diagram illustrating function data.

Hereinafter, the function data stored in the internal memory according to some embodiments of the present application will be described with reference to FIGS. 5, 9, and 10. FIG. 10 is a diagram for explaining the function data. FIG. 10 illustrates the case where the activation function is tanh, but the present disclosure is not limited thereto. In FIG. 10, a horizontal axis represents an input domain x of the function, and a vertical axis represents an output domain y of the function.

In some embodiments, the internal memory 160 may store function data that includes a partial region of the activation functions. For example, the function data stored in the internal memory 160 may include function data of a data region $R_D$ illustrated in FIG. 10. The data region $R_D$ may be a partial region of the tanh function. For example, the data region $R_D$ may be a region having a specific domain (e.g., $-1.5<x<1.5$). The internal memory 160 may conserve resources (e.g., memory space), by storing the function data including a partial region of the activation function rather than the overall data of the activation function.

Figure 11:
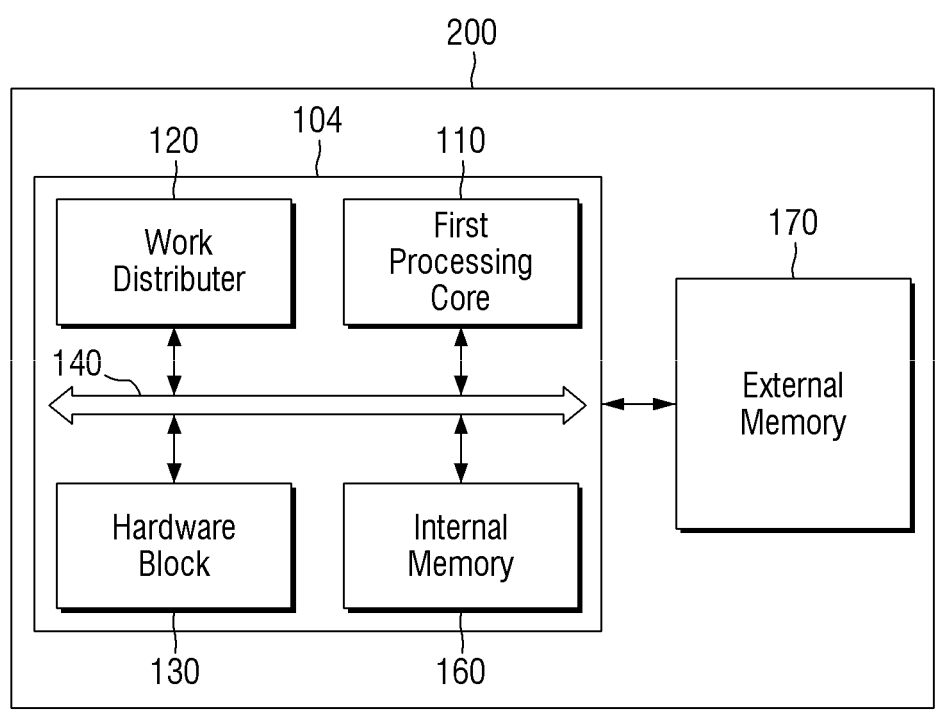
FIG. 11 is a block diagram of the neural processing system according to some embodiments.
Figure 12:
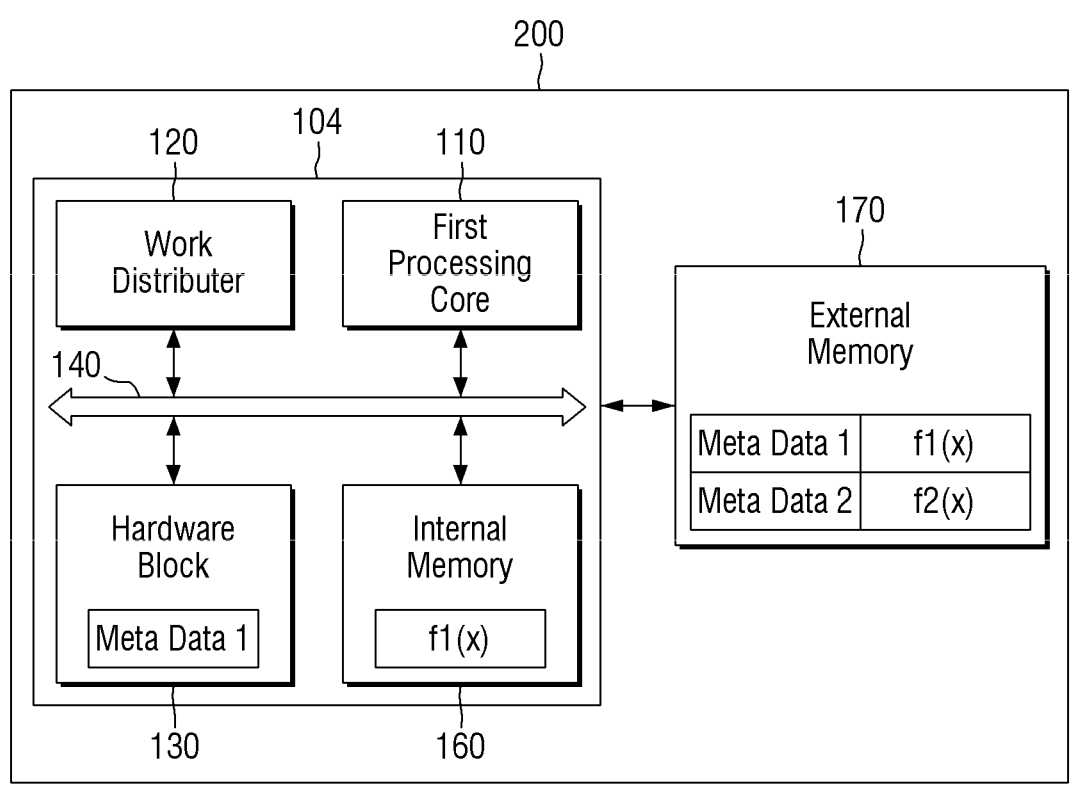
FIG. 12 is a block diagram of the neural processing system according to some embodiments.
Figure 13:
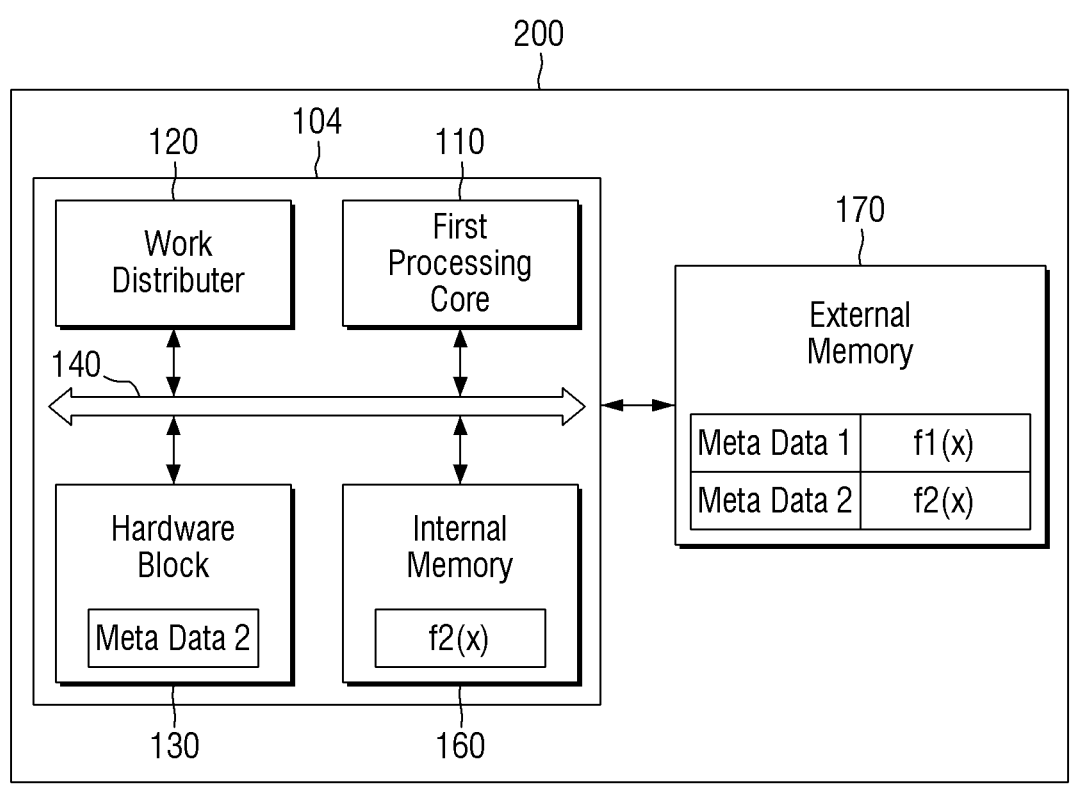
FIG. 13 is a block diagram of the neural processing system according to some embodiments.

Hereinafter, the neural processing system according to some embodiments of the present application will be described with reference to FIGS. 11 to 13. For convenience of explanation, differences from those described in FIGS. 1 to 10 will be mainly described. FIGS. 11 through 13 are block diagrams of the neural processing system according to some embodiments.

Referring to FIG. 11, a neural processing system 200 according to some embodiments of the present application may include a neural processing unit 104 and/or an external memory 170. According to some example embodiments, operations described herein as being performed by the external memory 170 may be performed by at least one processor (e.g., the at least one first processor, the at least one second processor and/or the at least one third processor) executing program code that includes instructions corresponding to the operations. The instructions may be stored in a memory of the neural processing unit 100 (e.g., the internal memory 160), a memory of the first processing core 110 and/or a memory of the hardware block 130.

The external memory 170 may store meta data for reconfiguring the hardware block 130 of the neural processing unit 104. For example, the external memory 170 may include CNN reconfiguration data for reconfiguring the hardware block 130 to the CNN processing hardware core 132 and/or RNN reconfiguration data for reconfiguring the hardware block 130 as the RNN processing hardware core 134. Also, the external memory 170 may include MAC reconfiguration data for reconfiguring the hardware block 130 as the MAC processing hardware core 136. For example, the MAC reconfiguration data may include reconfiguration data for reconfiguring the hardware block 130 as a MAC processing hardware core 136 including a look-up table for storing the quantized weighted data.

The external memory 170 may store all the function data used in the first neural processing core 110 and/or the hardware block 130. The external memory 170 may provide the stored function data to the neural processing unit in accordance with operations executed in the first processing core 110 and/or the hardware block 130. The function data provided from the external memory 170 may be stored in the internal memory 160. The function data stored in the internal memory 160 may be updated, using the function data provided from the external memory 170.

For example, referring to FIGS. 12 and 13, the external memory 170 includes first meta data (Meta data 1) for reconfiguring the hardware block 130 as the first hardware core, and second meta data (Meta data 2) for reconfiguring the hardware block 130 as the second hardware core. In addition, the external memory 170 includes first activation function data f(1x) and second activation function data f(2x).

In FIG. 12, the external memory 170 may provide the first meta data to the neural processing unit 104. In an embodiment, the hardware block 130 may be reconfigured as the first hardware core using the first meta data. Also, the external memory 170 may provide the first activation function data to the neural processing unit 104. In an embodiment, the first activation function data may be stored in the internal memory 160.

Is FIG. 13, the external memory 170 may provide the second meta data to the neural processing unit 104. In an embodiment, the hardware block 130 may be reconfigured as the second hardware core using the second meta data. Further, the external memory 170 may provide the second activation function data to the neural processing unit 104. In an embodiment, the second activation function data may be stored in the internal memory 160.

The external memory 170 may be a memory device that may be normally used. For example, the external memory 170 may be a dynamic random access memory (DRAM) and/or a flash memory. In addition, the external memory may be, but is not limited to, an SSD (Solid State Drive) device including a flash memory.

Figure 14:
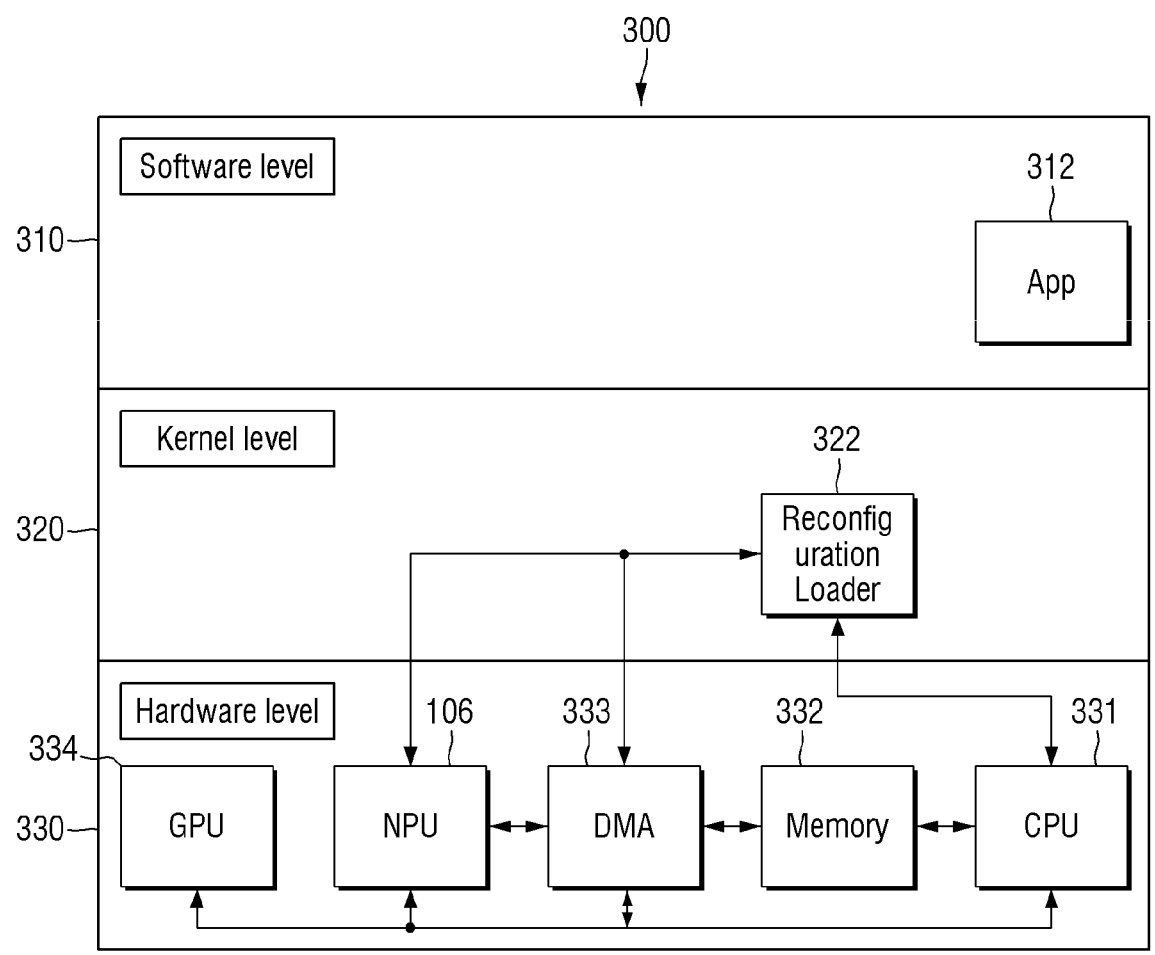
FIG. 14 is a block diagram of an application system according to some embodiments.

Hereinafter, an application system according to some embodiments of the present application will be described with reference to FIG. 14. FIG. 14 is a block diagram of the application system according to some embodiments.

Referring to FIG. 14, an application system 300 according to some embodiments of the present application includes a software level 310, a kernel level 320 and/or a hardware level 330. For the convenience of explanation, the application system 300 disclosed in FIG. 14 is illustrated as including the software level 310, the kernel level 320 and the hardware level 330, but embodiments are not limited thereto. Also, the software level 310, the kernel level 320, and/or the hardware level 330 may be conceptual levels for explaining operations of the application system 300.

In some embodiments, the application 312 is executed on the software level 310. For example, the software level 310 may indicate that the application-works executed in a CPU 331, a GPU 334 and/or the neural processing unit 106 is executed, as it will be described later.

In some embodiments, the hardware level 330 may include the neural processing unit 106, the CPU, 331, the memory 332, a DMA (direct memory access) 333, and/or the GPU 334.

In some embodiments, the neural processing unit 106 may include a first processing core, a work distributer, a hardware block and/or a bus. As an example, the neural processing unit 106 may be the neural processing unit 100 described with reference to FIGS. 1 through 4. As another example, the neural processing unit 106 may be the neural processing unit 102 described with reference to FIG. 8. As still another example, the neural processing unit 106 may be the neural processing unit 104 described with reference to FIG. 9.

The CPU 331 may perform an operation to execute the application 312. For example, when the execution of the application 312 is requested by a user device, the CPU 331 may perform the series of application-works for execution of the application 312. Also, the CPU 331 may distribute a part of the application-works to the neural processing unit 106 and/or the GPU 334. In some embodiments, the CPU 331 distributes the application-work including the first neural network operation among the application-works to the neural processing unit 106. In addition, the CPU 331 may distribute partial application-work among the application-works to the GPU 334.

In some embodiments, the application may determine on which processor (e.g., the CPU 331, the GPU 334 and/or the neural processing unit 106) the application-work is performed when compiled. The CPU 331 may identify information on the application-works from the compiled file and determine whether to distribute the specific application-work to the NPU 106 and/or the GPU 334.

In some embodiments, the CPU 331 may be a commonly used central processing unit. For example, the CPU 331 may be made up of a register, a program counter, an instruction register, an arithmetic logic unit, a control unit, an internal bus, and/or the like. For the sake of convenience of explanation, detailed description of the CPU 331 will not be provided.

The GPU 334 may perform the distributed application-work from the CPU 331. For example, the CPU 331 may distribute the application-work including an image operation and/or the like to the GPU 334. The GPU 334 performs the application-work including the image operation and/or the like, and then may transfer the execution result to the CPU 331.

In some embodiments, the GPU 334 may be a graphics processing device that may be used normally. For example, the GPU 334 may include, but is not limited to, a plurality of ALUs (arithmetic logic units).

The memory 332 may store data for execution of the application 312. For example, the memory 332 may store a program code, a library code and/or the like for executing the application 312. Specifically, for example, when the application 312 is executed in the CPU 331, the memory 332 may call the program code, the library code and/or the like for executing the application 312 from an external storage device such as an SSD device.

The program code may be code for executing the application 312. In some embodiments, the program code may be executed in the CPU 331, the GPU 334, and/or the neural processing unit 106. For example, the application-work for execution of the application 312 may be stored in the memory in the form of program code.

The library code may include function data and/or the like used for executing the application 312. For example, when performing the application-work in the GPU 334 and/or the neural processing unit 106, the GPU 334 and/or the neural processing unit 106 may call the function data used for performing the application-work from the library code stored in the memory.

The memory 332 may store meta data for reconfiguring the hardware block of the neural processing unit 106. For example, the memory 332 may store reconfiguration data for reconfiguring the hardware block as the hardware core for executing the first neural network operation. In addition, the memory 332 may store reconfiguration data for reconfiguring the hardware block as the hardware core for processing the RNN, CNN and/or MAC operation.

In some embodiments, the memory 332 may be a memory device that may be normally usable. For example, the memory 332 may be, but is not limited to, a DRAM.

The DMA 333 may transfer the data stored in the memory 332 to the GPU 334 or the neural processing unit 106 without intervention of the CPU 331. For example, when the function data used for performing the application-work is requested by the GPU 334 or the neural processing unit 106, the DMA 333 may transfer the function data stored in the memory 332 to the GPU 334 and/or the neural processing unit 106, without going through the CPU 331. In some embodiments, the DMA 333 may transfer the meta data stored in memory 332 to the neural processing unit 106.

The DMA 333 may be DMA that may be used usually. For example, the DMA 333 may be implemented, but is not limited to, as hardware including a source register, a destiny register, a counter register, a CPU control register and/or a bus controller.

The kernel level 320 may include a reconfiguration loader 322. In some embodiments, the reconfiguration loader 322 may be connected to the DMA 333, the CPU 331 and/or the neural processing unit 106 included in the hardware level 330 to transfer the meta data from the memory 332 to the neural processing unit 106. According to some example embodiments, operations described herein as being performed by the reconfiguration loader 322 may be performed by at least one processor (e.g., the CPU 331 and/or the at least one first processor) executing program code that includes instructions corresponding to the operations. The instructions may be stored in a memory of the application system 300 and/or the neural processing unit 106 (e.g., the memory 332 and/or internal memory 160).

More specifically, the work distributer of the neural processing unit 106 may allocate a part of the application-works, which are distributed from the CPU 331, to the hardware block-work. For example, the work distributer of the neural processing unit 106 may allocate a part of the application-works to the hardware block-work in accordance with the first workload of the first processing core. The neural processing unit 106 may request the reconfiguration loader 322 for meta data for reconfiguring the hardware block as the hardware core for executing the hardware block-work. For example, the neural processing unit 106 may request the reconfiguration loader 322 for meta data in accordance with the first workload of the first processing core. The reconfiguration loader 322 may transfer the meta data stored in the memory 332 to the neural processing unit 106, using the DMA 333. Further, when the use of the DMA 333 is impossible or undesirable, the reconstruction loader 322 may transfer the meta data stored in the memory 332 to the neural processing unit 106, using the CPU 331.

Figure 15:
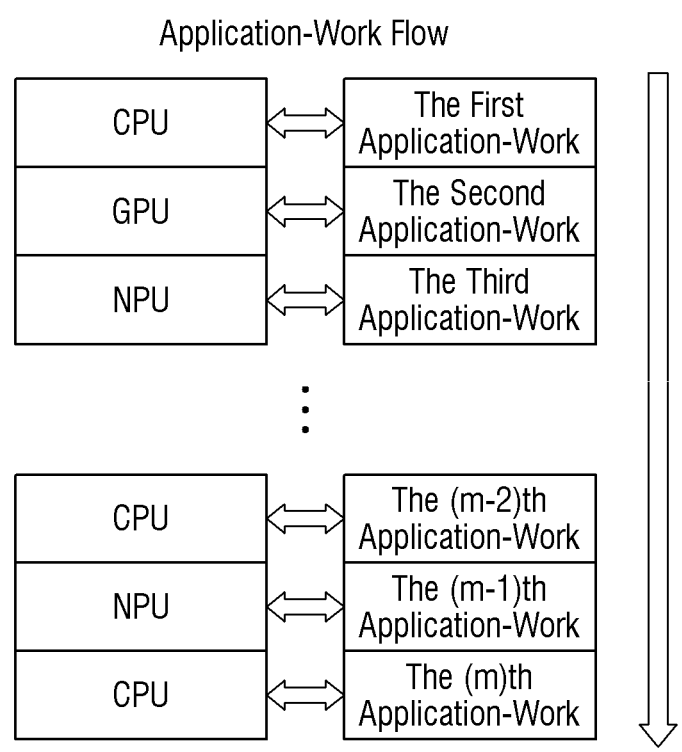
FIG. 15 is a block diagram illustrating the flow of application-work according to some embodiments.
Figure 16:
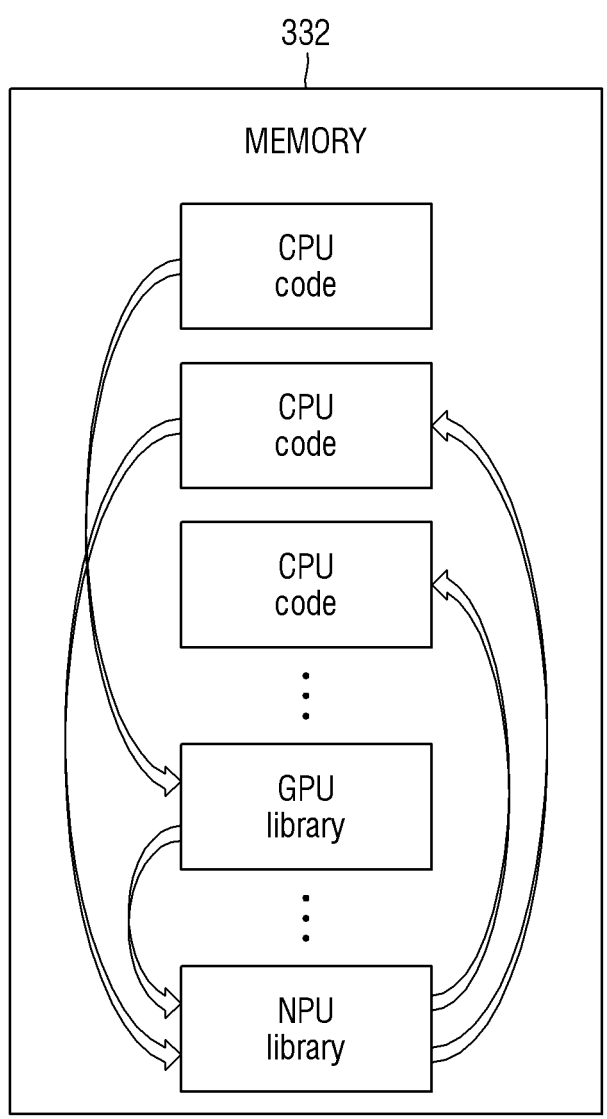
FIG. 16 is a block diagram illustrating a data flow in a memory according to some embodiments.

Hereinafter, a flow of the application-work executed in the application system according to some embodiments of the present application will be described with reference to FIGS. 14 to 16. FIG. 15 is a block diagram illustrating the flow of application-work according to some embodiments. FIG. 16 is a block diagram illustrating the data flow in the memory according to some embodiments.

Referring to FIG. 15, first to m-th application-works may be executed to execute the application. In some embodiments, the first to m-th application-works may be performed by a CPU, a GPU and/or a neural processing unit (NPU). For example, the first, m-$2^{nd}$ and m-th application-works may be performed in the CPU, the third and m-$1^{st}$ application-works may be executed in the neural processing unit, and the second application-work may be performed the GPU.

Referring to FIG. 16, when the application is executed, the program code and/or the library code may be read from the memory 332. In some embodiments, as illustrated in FIG. 15, when the first to m-th application-works are executed, the CPU program code, the GPU library code and/or the NPU library code may be read from the memory 332. For example, when the first, m-$2^{nd}$, and m-th application-works are performed in the CPU 331, the CPU 331 may read the CPU program code from the memory 332. In addition, when the third and m-$1^{st}$ application-works are performed by the neural processing unit 106, the DMA 333 and the CPU 331 may read the neural processing unit library code stored in the memory 332 and transfer the neural processing unit library code to the neural processing unit 106. Further, when the second application-work is performed by the GPU 334, the DMA 333 and/or the CPU 331 may read the GPU library code stored in the memory 332 and transfer the GPU library code to the GPU 334.

The various operations of methods described above may be performed by any suitable device capable of performing the operations, such as various hardware and/or software implemented in some form of hardware (e.g., processor).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In concluding the detailed description, those skilled in the art will appreciate that many variations and modifications may be made to example embodiments without substantially departing from the principles of the present disclosure. Therefore, example embodiments of the disclosure are used in a generic and descriptive sense only and not for purposes of limitation.

What is claimed is:

1. A neural processing unit configured to perform application-work including a first neural network operation, the neural processing unit comprising:
a first processing core configured to execute the first neural network operation;
a hardware block reconfigurable as a hardware core configured to perform hardware block-work, the hardware block being reconfigurable between different types of hardware cores for performing different types of operations, and the different types of operations including different types of neural network operations; and
at least one processor configured to execute computer-readable instructions to
distribute a part of the application-work as the hardware block-work to the hardware block based on a first workload of the first processing core, and
reconfigure the hardware block as a first type of hardware core for performing a first type of operation included in the hardware block-work, the first type of hardware core being among the different types of hardware cores, the first type of operation being among the different types of operations, and the first neural network operation including the first type of operation.

2. The neural processing unit of claim 1, wherein the at least one processor is configured to execute computer-readable instructions to distribute a part of the first neural network operation as the hardware block-work to the hardware block depending on whether the first workload exceeds a defined value.

3. The neural processing unit of claim 1, wherein the at least one processor is configured to execute computer-readable instructions to reconfigure the hardware block as a convolutional neural network (CNN) processing hardware core when the hardware block-work includes a CNN operation.

4. The neural processing unit of claim 3, wherein the CNN operation comprises image recognition processing.

5. The neural processing unit of claim 1, wherein the at least one processor is configured to execute computer-readable instructions to reconfigure the hardware block as a recurrent neural network (RNN) processing hardware core when the hardware block-work includes an RNN operation.

6. The neural processing unit of claim 5, wherein the RNN operation comprises voice recognition processing.

7. The neural processing unit of claim 1, wherein
the first neural network operation comprises a first multiply and accumulate (MAC) operation, and
the at least one processor is configured to execute computer-readable instructions to distribute a part of the first MAC operation as the hardware block-work to the hardware block based on a ratio of the first MAC operation and the first workload.

8. The neural processing unit of claim 1, wherein
the at least one processor is configured to execute computer-readable instructions to reconfigure the hardware block as a MAC processing hardware core when the hardware block-work includes a MAC operation, and the hardware block reconfigured as a MAC processing hardware core is configured to perform the MAC operation using a look-up table including quantized weighted data.

9. The neural processing unit of claim 8, wherein the look-up table comprises one or more result value obtained based on operating input data and the quantized weighted data.

10. The neural processing unit of claim 1, further comprising:

a second processing core configured to execute a second neural network operation different from the first neural network operation, wherein the application-work comprises the second neural network operation, and at least one processor is configured to execute computer-readable instructions to distribute a part of the first neural network operation or a part of the second neural network operation as the hardware block-work to the hardware block based on the first workload and a second workload of the second processing core.

11. The neural processing unit of claim 10, wherein the at least one processor is configured to execute computer-readable instructions to distribute the part of the first neural network operation as the hardware block-work to the hardware block in response to an amount of the first workload being larger than an amount of the second workload, and distribute the part of the second neural network operation as the hardware block-work to the hardware block in response to the amount of the first workload being smaller than the amount of the second workload.

* * * * *